(12) United States Patent
Hayden et al.

(10) Patent No.: US 10,739,235 B2
(45) Date of Patent: Aug. 11, 2020

(54) ARRANGEMENT, SUBSTRATE AND METHOD FOR PREPARING A CELL SAMPLE

(75) Inventors: Oliver Hayden, Herzogenaurach (DE); Sandro Francesco Tedde, Erlangen (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 422 days.

(21) Appl. No.: 13/383,072

(22) PCT Filed: May 14, 2010

(86) PCT No.: PCT/EP2010/056661
§ 371 (c)(1),
(2), (4) Date: Jan. 9, 2012

(87) PCT Pub. No.: WO2011/003654
PCT Pub. Date: Jan. 13, 2011

(65) Prior Publication Data
US 2012/0115179 A1    May 10, 2012

(30) Foreign Application Priority Data
Jul. 9, 2009   (DE) .................. 10 2009 032 428

(51) Int. Cl.
*C12M 1/00* (2006.01)
*C12Q 1/02* (2006.01)
*G01N 1/28* (2006.01)

(52) U.S. Cl.
CPC ... *G01N 1/2813* (2013.01); *B01J 2219/00518* (2013.01); *B01J 2219/00702* (2013.01); *B01J 2219/00743* (2013.01)

(58) Field of Classification Search
CPC .... B01J 2219/00518; B01J 2219/00702; B01J 2219/00743; G01N 1/2813; G01N 21/8483; C12M 23/00
(Continued)

(56) References Cited

U.S. PATENT DOCUMENTS 3,948,732 A * 4/1976 Haddad .................. C12M 23/24
  435/293.2
4,013,418 A * 3/1977 Plakas .................... G01N 21/76
  422/52

(Continued)

FOREIGN PATENT DOCUMENTS

DE   10 2004 008 319   9/2005
DE       602 01 257    9/2005
(Continued)

OTHER PUBLICATIONS

Fuhr et al., "English language translation, DE102005031648A1", translated on Feb. 5, 2015.*
(Continued)

*Primary Examiner* — Liban M Hassan
(74) *Attorney, Agent, or Firm* — Slayden Grubert Beard PLLC

(57) ABSTRACT

A flexible, thin, elongated band is used as a substrate. Similarly to a magnetic tape, the band is unwound from a feed reel and is transported past an outlet opening of a receptacle containing the cells such that the cells are poured onto the band. Subsequently, the band containing the cells applied thereon is wound onto a take-up reel. The take-up reel is fixed on a drive shaft which can be rotated by a drive mechanism. The rotation thus achieved has the effect that the band is unwound, transported past the outlet opening and finally wound up. In addition, spacers are provided at the upper surface of the band in order to prevent the contacting (Continued)

of radially adjacent sections of the band containing the cells in a wound-up state.

9 Claims, 6 Drawing Sheets

(58) Field of Classification Search
USPC .................................................. 435/309.1
See application file for complete search history.

(56) References Cited

U.S. PATENT DOCUMENTS

| | | | | |
|---|---|---|---|---|
| 4,401,695 | A * | 8/1983 | Sopko | B05D 1/12 |
| | | | | 118/308 |
| 5,073,495 | A * | 12/1991 | Anderson | 435/286.2 |
| 5,470,739 | A * | 11/1995 | Akaike | C12N 5/0068 |
| | | | | 435/283.1 |
| 5,508,200 | A | 4/1996 | Tiffany et al. | |
| 5,593,814 | A * | 1/1997 | Matsuda | C12N 5/0068 |
| | | | | 430/14 |
| 6,284,546 | B1 * | 9/2001 | Bryning et al. | 436/172 |
| 6,632,653 | B1 * | 10/2003 | Astle | 435/287.2 |
| 7,404,930 | B2 | 7/2008 | Fouillet et al. | |
| 7,422,911 | B2 | 9/2008 | Schembri | |
| 7,883,865 | B2 * | 2/2011 | Saito | A61L 27/3804 |
| | | | | 435/402 |
| 2002/0001813 | A1 | 1/2002 | Taylor et al. | |
| 2007/0148762 | A1 * | 6/2007 | Miyake | C12N 5/0068 |
| | | | | 435/289.1 |
| 2007/0259382 | A1 | 11/2007 | Salem | |
| 2008/0206774 | A1 | 8/2008 | Tafas et al. | |
| 2010/0062529 | A1 * | 3/2010 | Zimmermann et al. | 435/379 |

FOREIGN PATENT DOCUMENTS

| | | | | |
|---|---|---|---|---|
| DE | 10 2005 031 648 | | 1/2007 | |
| DE | 10 2009 032 428.3 | | 7/2009 | |
| EP | 1 249 702 | | 10/2002 | |
| EP | 1 415 710 | | 5/2004 | |
| WO | WO 03046210 | A1 * | 6/2003 | G01N 33/521 |
| WO | 2004/034057 | | 4/2004 | |
| WO | WO-2008051265 | A9 * | 6/2008 | C12N 5/0062 |
| WO | WO-2009066769 | A1 * | 5/2009 | C12M 23/20 |
| WO | PCT/EP2010/056661 | | 5/2010 | |

OTHER PUBLICATIONS

Fuwa Kou, "English translation of document WO-2009066769-A1." (Year: 2009).*
A. Ruiz et al., "Single Stem Cell Positioning on Polylysine and Fibronectin Microarrays," Micro and Nanosystems, 2009, pp. 50-56.
International Search Report for PCT/EP2010/056661, dated Aug. 19, 2010.
German Office Action for copending German Application No. 10 2009 032 428.3, dated Mar. 3, 2010.

* cited by examiner

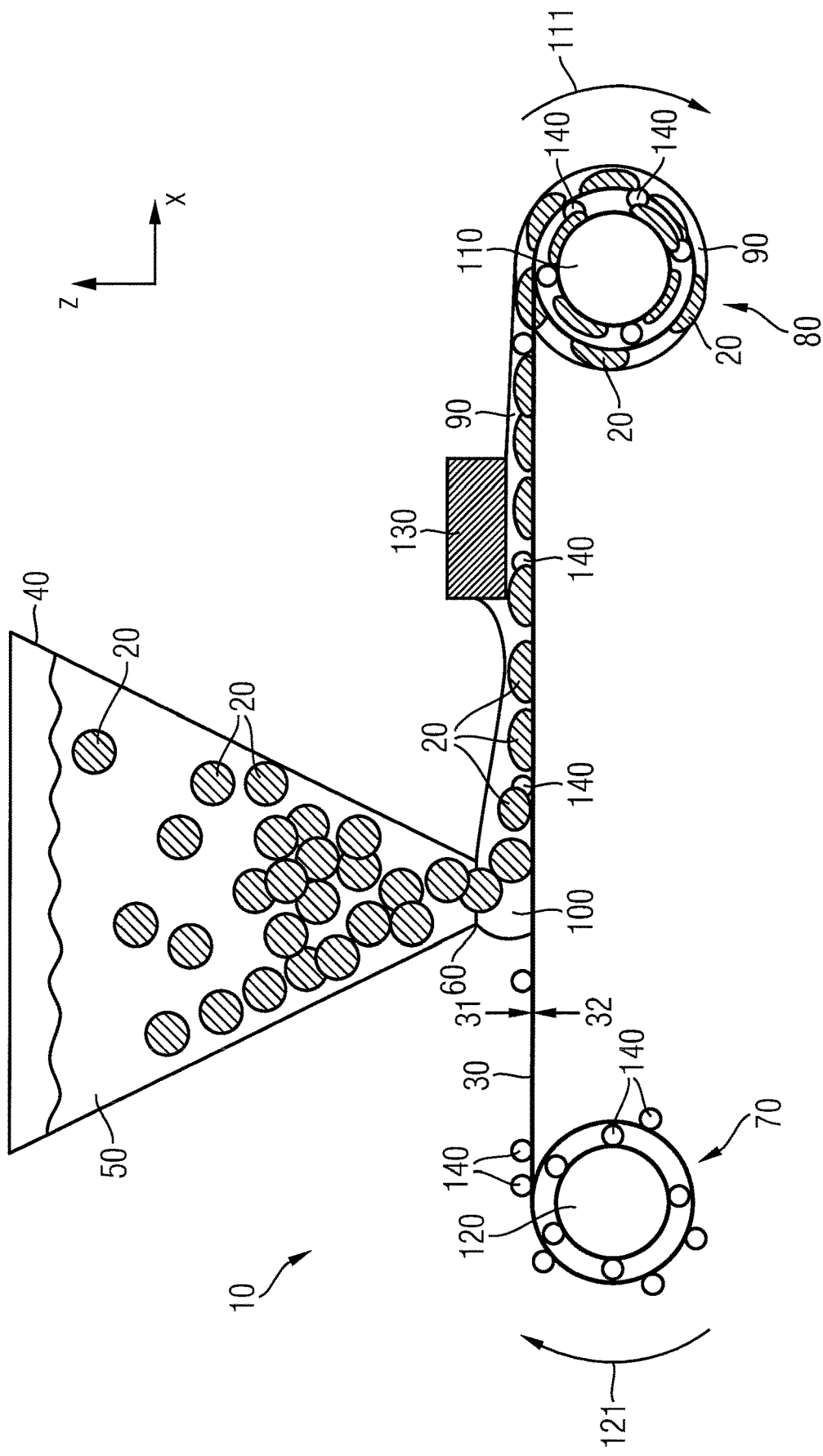

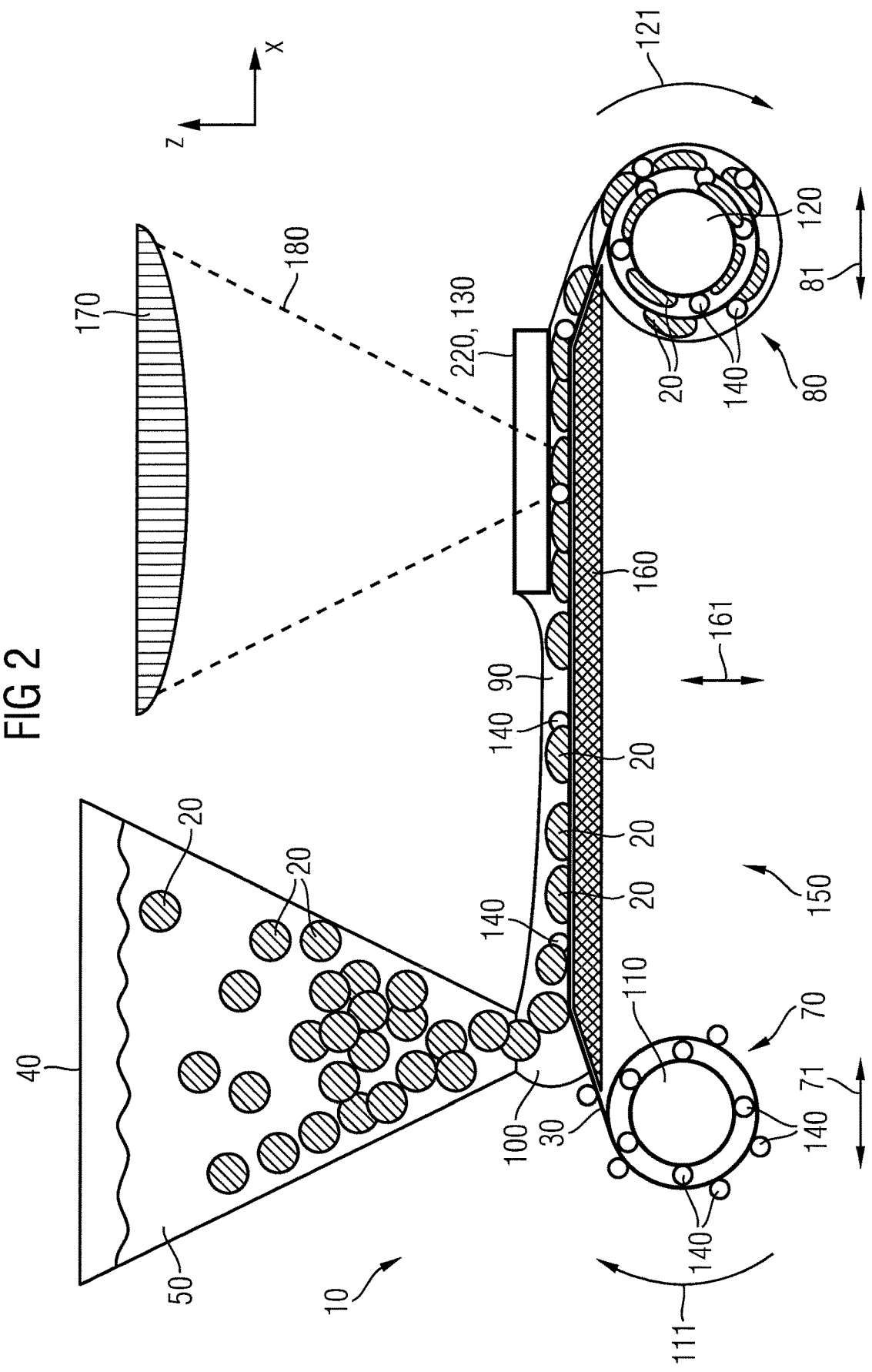

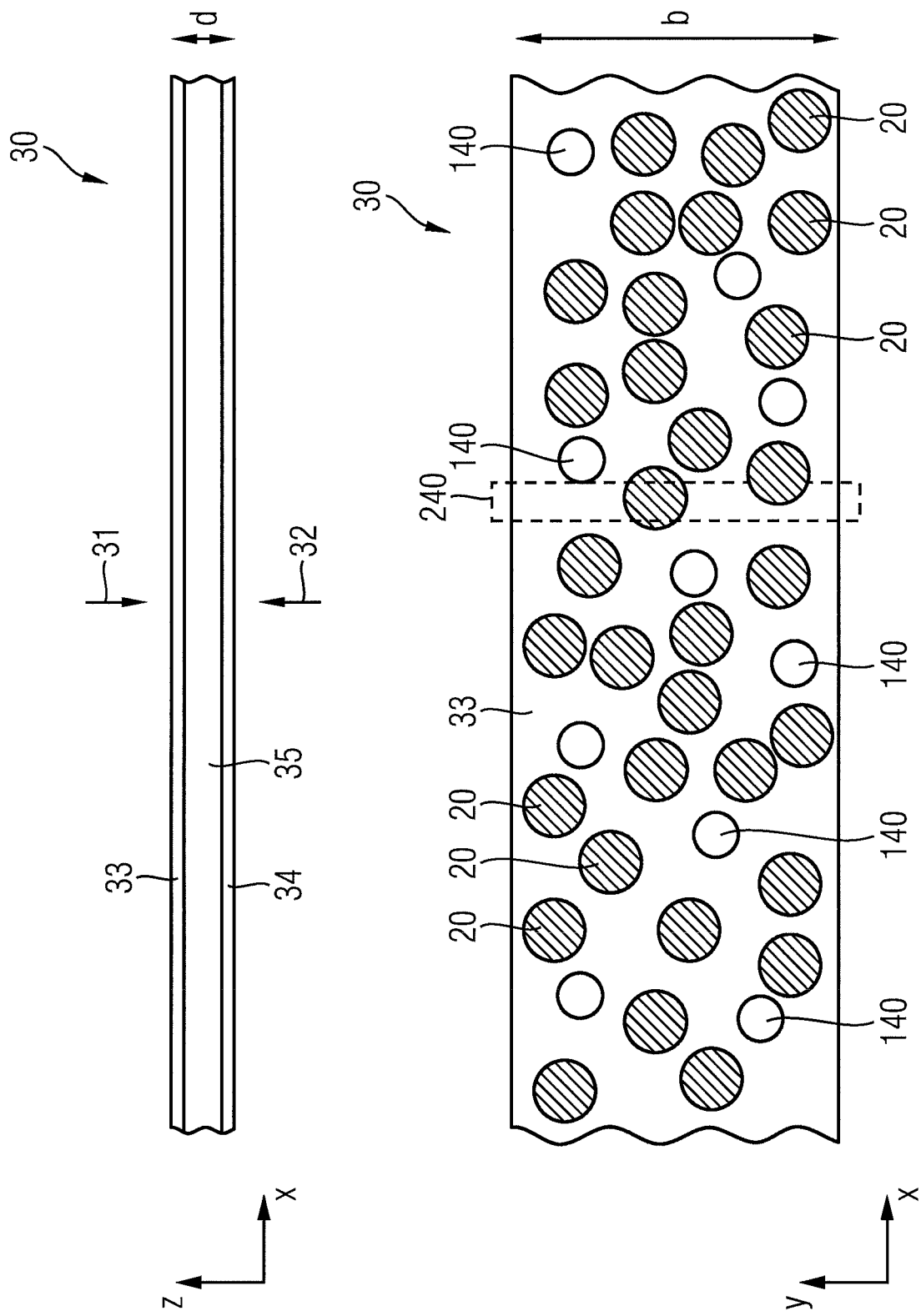

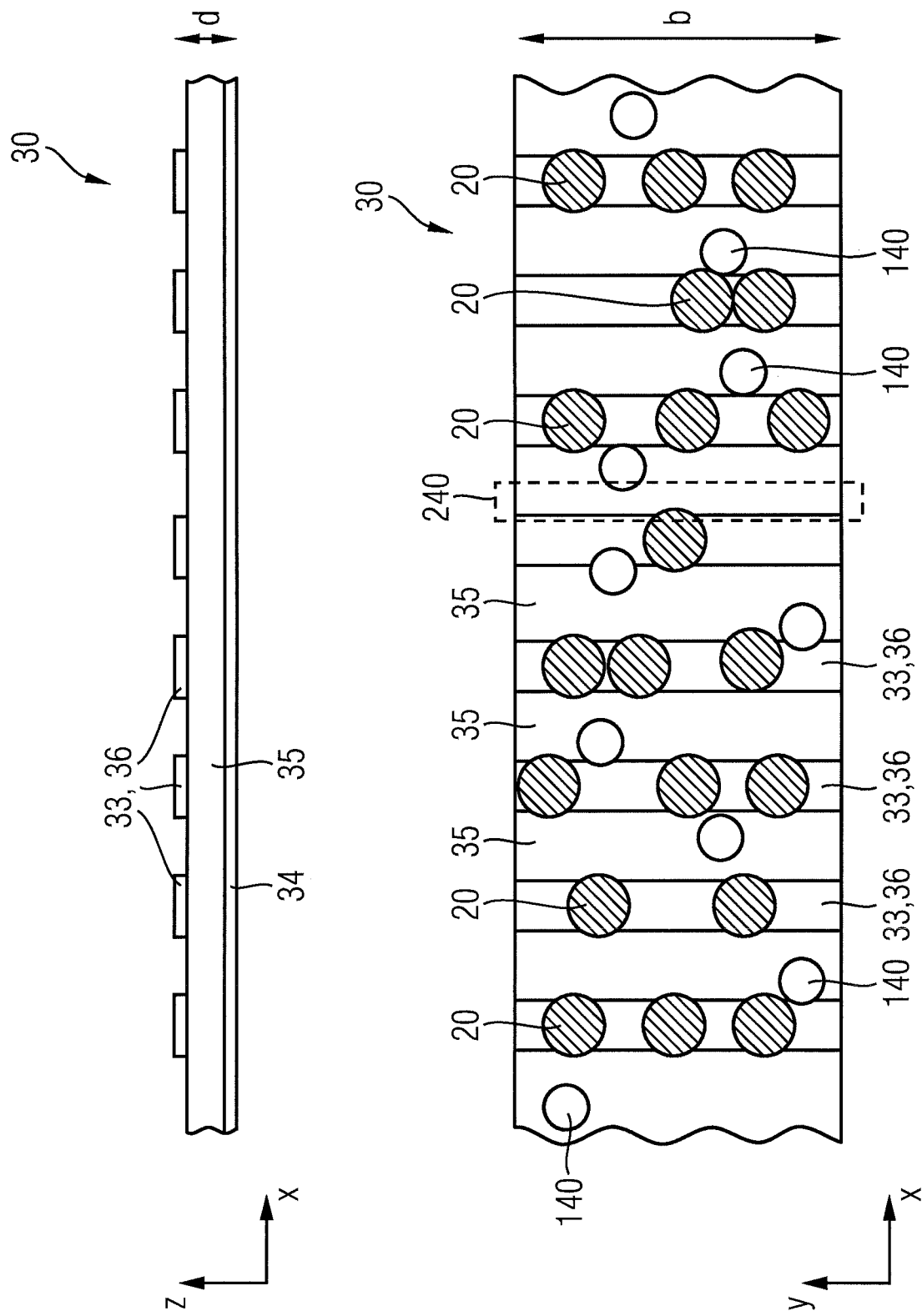

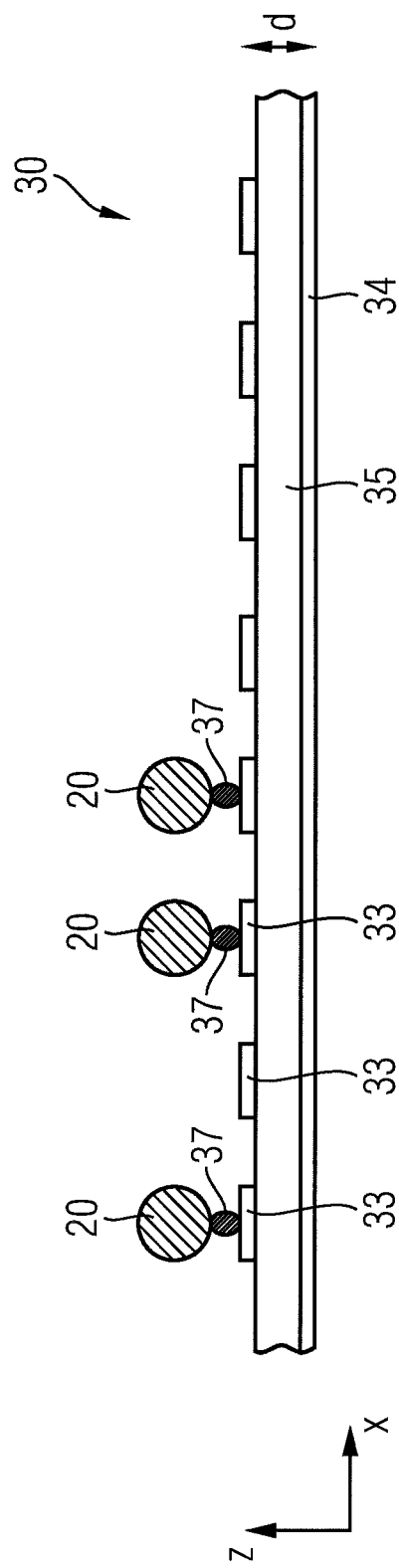

ARRANGEMENT, SUBSTRATE AND METHOD FOR PREPARING A CELL SAMPLE

CROSS REFERENCE TO RELATED APPLICATIONS

This application is based on and hereby claims priority to International Application No. PCT/EP2010/056661 filed on May 14, 2010 and German Application No. 10 2009 032 428.3 filed on Jul. 9, 2009, the contents of which are hereby incorporated by reference.

BACKGROUND

The invention relates to an arrangement and a substrate, and also to a method for preparing a cell sample.

Cell analysis, more particularly single cell analysis, in which a cell sample comprising a multiplicity of individual cells is analyzed, is an essential basis for prognostic and therapeutic applications in clinical medicine. By way of example, the detection of disseminated tumor cells represents a great challenge to the equipment used for the analysis.

For the purpose of single cell analysis of large sample amounts, such as e.g. 10 ml whole blood, use is primarily made of fluorescence microscopy. An essential precondition for meaningful microscopy is a controlled and sparing sample preparation in which, inter alia, the cells to be examined by microscopy have to be brought into the same focal plane of the microscope. To this end, substantially two approaches, which moreover allow high flow, are known:

In the so-called fluorescence activated cell sorting (FACS) method, the individual cells are moved and are individually transported through a capillary. Fluorescence is detected there with the aid of fixed optics. The FACS method makes it possible to detect optical information in the form of stray light and fluorescence. However, disadvantageously, the sample preparation is carried out using erythrocyte lysis, which can typically lead to losses in the cells to be analyzed.

In an alternative method, the cells are fixed on a substrate and the microscope optics scan a comparatively large area, on which the cells are fixed. The single cells are present in the form of a cell suspension. Two methods are known for the preparation. In the method by Cytotrack, the cell suspension is poured onto a substrate that is similar to a CD. The individual cells are subsequently scanned in a fashion that, in principle, is equivalent to the read procedure of a CD. This takes about 30 minutes. The cell suspension can also be poured onto e.g. a large-area support such that the cells are to be scanned with the aid of a bundle of optical waveguides. By way of example, this should make it possible to scan 60 million cells in a 10 ml blood sample within approximately 80 minutes. A disadvantage of both these methods is that large substrates are required, onto which the cell suspension is poured. There likewise is a need for complicated scanner optics, possibly with a translation stage. Moreover, there must be a relatively complicated pre-enrichment of cells, during which cells are initially marked magnetically and the marked cells are subsequently selected by e.g. applying a magnetic field.

In a further approach, the sought after tumor cells are purified by e.g. an immunomagnetic method or by centrifugation techniques such as e.g. the so-called "OncoQuick" method by Greiner Bio-One and subsequently scanned using fluorescence microscopy, e.g. a system from Wavesense, instead of scanning the entire sample volume for individual cells like above. A disadvantage here is that a plurality of sample preparation steps are required, with some analytes being lost in each step.

US 2008/0206774 A1 has disclosed a method for preparing a blood cell sample.

SUMMARY

It is therefore one possible object to specify an alternative option for preparing a cell sample.

The inventors propose an arrangement for depositing cells on a substrate for preparing a cell sample, the arrangement having a vessel for storing the cells to be deposited on the substrate, the vessel having an outlet opening for removing cells from the vessel. The arrangement furthermore has a drive device, by which the substrate can be moved past the outlet opening relative to the vessel. The substrate is a flexible, elongate band, more particularly a polymer band or a metal band. The drive device is a rotatable shaft, which can be made to rotate by a drive mechanism. A take-up reel should be attached to the drive shaft in order to wind the substrate, more particularly the substrate provided with the cells, onto the take-up reel.

In the process, it was found to be advantageous if spacers are provided on the upper side and/or the lower side of the substrate. The spacers prevent sections, which are adjacent to one another in the radial direction, of the substrate wound onto the take-up reel from touching.

Furthermore, provision can be made for an adhesive layer to which the cells adhere, more particularly an adhesion promoter for the cells, on the upper side of the substrate, onto which the cells are applied. Alternatively, or in addition thereto, a layer to which the cells do not adhere can be provided on the lower side of the substrate.

A tensioning device can be used to set the tension in the substrate.

The tensioning device can be implemented by at least one moveable support or by at least one moveable reel. Here, the support or the reel can be displaced in a direction that is oriented substantially perpendicularly to the movement direction of the substrate.

Moreover, the distance between the outlet opening of the vessel containing the cell sample and the substrate can be set such that this can be used to set the thickness h of the liquid film forming on the substrate. Alternatively, or in addition thereto, provision can be made for a stripping object, the distance of which from the substrate can be set and by which it is possible to set the thickness h of the liquid film forming on the substrate.

The inventors further propose a substrate for a cell sample comprising a multiplicity of cells is distinguished in that the substrate is a flexible, elongate band, more particularly a polymer band or a metal band.

The substrate can be wound onto a take-up reel. Furthermore, spacers are provided on the upper side and/or the lower side of the substrate, which spacers prevent sections, which are adjacent to one another in the radial direction, of the substrate wound onto the take-up reel from touching.

The adhesive layer can also be designed such that marked cells are fixed on the upper side of the substrate.

The adhesive layer is advantageously structured such that the applied cells are at defined positions on the substrate.

The inventors also propose a method for depositing cells on a substrate for preparing a cell sample. With the method, the cells are applied to the substrate from a vessel while the substrate is moved past the vessel, wherein the substrate is a flexible, virtually two-dimensional band. Here, cells are firstly applied to sections of the band from the vessel. Later, the sections of the band with the cells applied thereon are wound onto a take-up reel.

Advantageously, the cell sample is analyzed after the cells have been applied to the band and before the band is wound onto the take-up reel.

The advantages of the proposals can be summarized as follows:
- Since the substrate or the band can be wound, only little space is required.
- The optics, for example a microscope, are static and hence they are simpler and more cost-effective than in the aforementioned systems, in which the microscope needs to be displaced in up to three directions x, y and z.
- The band can be scanned over the whole width thereof in only a single pass with the aid of e.g. a scanner composed of a plurality of optical waveguide cables.
- In contrast to known scanners, the substrate need not be displaceable in all three directions x, y and z.
- The cells can be scanned directly after depositing the cells on the substrate and before the latter is wound onto the take-up reel.

BRIEF DESCRIPTION OF THE DRAWINGS

These and other objects and advantages of the present invention will become more apparent and more readily appreciated from the following description of the preferred embodiments, taken in conjunction with the accompanying drawings of which:

FIG. 1A shows a device for preparing a sample,
FIG. 2 shows a device for preparing a sample with a directly adjoining cell analysis,
FIGS. 3 and 4 respectively show a longitudinal section and a plan view of a substrate,
and
FIG. 5 shows a longitudinal section through a substrate.

DETAILED DESCRIPTION OF THE PREFERRED EMBODIMENT

Figure 1B:
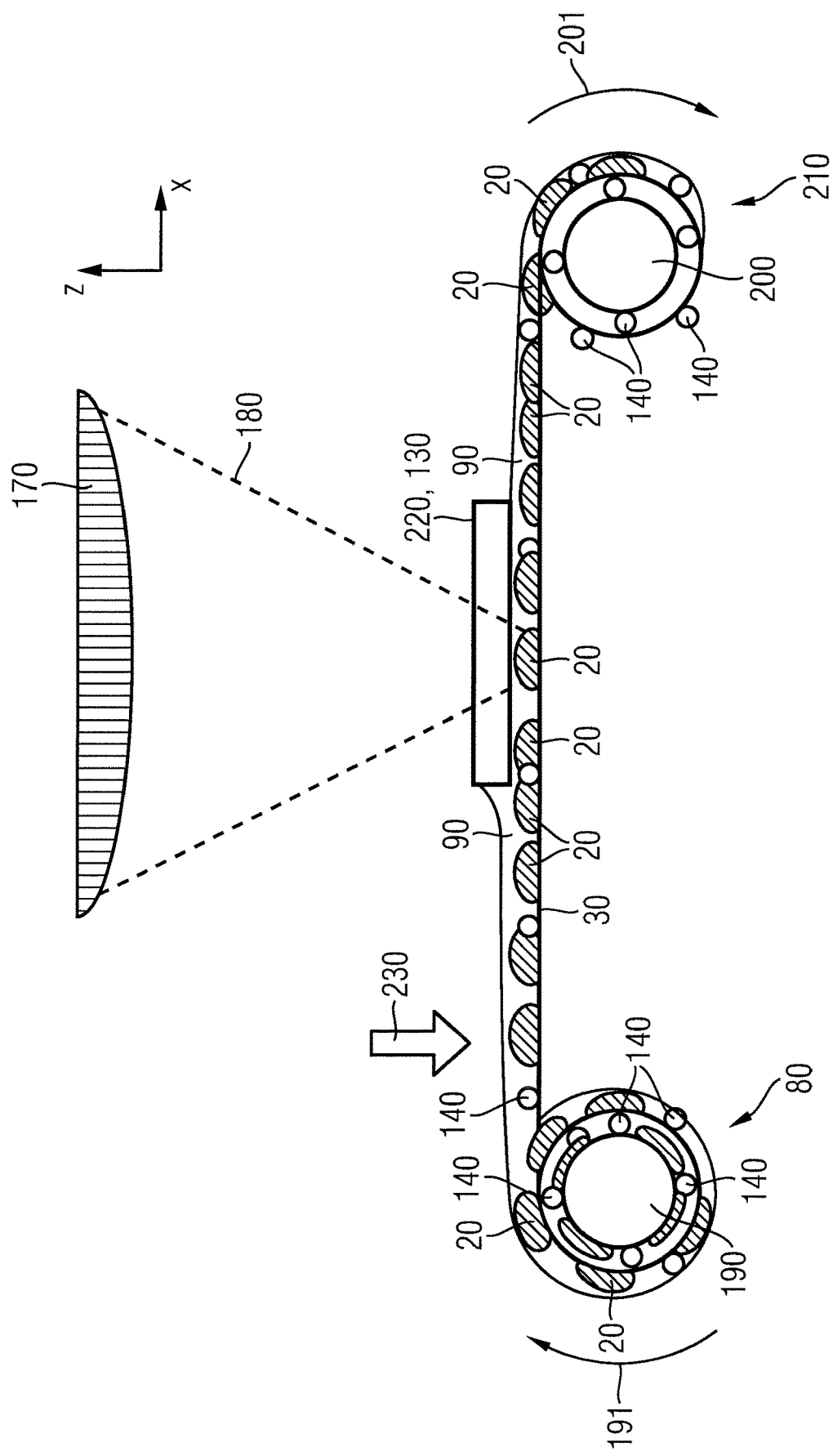
FIG. 1B shows a device for analyzing the sample.

Reference will now be made in detail to the preferred embodiments of the present invention, examples of which are illustrated in the accompanying drawings, wherein like reference numerals refer to like elements throughout.

FIG. 1A shows an arrangement 10, by which cells 20 to be examined can be applied onto a substrate 30 in order to prepare a cell sample for cell analysis, for example. The arrangement 10 has a funnel-shaped vessel 40, in which a cell suspension 50 comprising the cells 20 is situated. Situated on the lower side of the vessel 40 there is an outlet opening 60, through which the suspension 50, and with it the cells 20, can be applied onto the substrate 30. Sedimentation in the vessel 40 causes the cells 20 to sink downward in the suspension 50 and thus they can be removed from the outlet opening 60 without further aids. Nevertheless, use can be made of e.g. a pump (not illustrated) or the like in order to influence the flow rate $dn/dt$ or $dVol/dt$ through the outlet opening 40, i.e. the number do of cells 20 or the volume $dVol$ of suspension 50, which passes through the outlet opening 60 per unit time $dt$. Alternatively, or in addition thereto, the outlet opening 60 can be continuously opened and closed by a valve (not illustrated) or the like.

The substrate 30, onto which the cell suspension 50 should be applied, is a virtually two-dimensional, elongate band, for example a polymer band or a metal band. Here, the term "virtually two-dimensional" should be understood to mean that the thickness d of the band, which should correspond to the naturally present third dimension, can be neglected compared to the other two dimensions, i.e. the length l and the width b of the band. Not least as a result of this property the band is flexible and can be wound onto a corresponding reel such that a significant amount of space is saved compared to conventional substrates. The term "elongate" expresses the fact that the length l of the band is significantly greater than the width b. The band typically has a length of approximately l=50-100 m, a width of b=10-50 mm (cf. FIG. 3) and a thickness of d=10-100 μm (cf. FIG. 4). As the selection of the length of the band l and/or the width b of the band 30 increases, more cell suspension 50 can be deposited on the band as well. Accordingly, it is also possible to process comparatively highly diluted samples.

In FIG. 1A, the yet to be populated substrate or band 30, onto which cells 20 should be deposited in due course, is initially wound onto a feed reel 70 in the longitudinal direction of the band 30. By way of example, this is comparable to a tape reel for a tape recorder. In order to pass the cells 20 onto the band 30, the band 30 is initially at least partly unwound from the feed reel 70. The unwound sections of the band 30 are transported past the vessel 40 below the outlet opening 60, and so the cells 20 or the suspension 50 pour onto the band 30. A liquid film 90 of the cell suspension 50 in which the cells 20 are situated is formed on the band 30, with a meniscus 100 forming at the site of the outlet opening 60.

After the cells 20 have been applied to the band 30, the band 30 is wound onto a take-up reel 80. The take-up reel 80 is detachably attached to a drive shaft 110 of a drive device, which can be made to rotate with the aid of a drive mechanism (not illustrated here) of the drive device. In end effect, this makes it possible to transport the band 30 past the outlet opening 60 and to wind the former onto the take-up reel 80.

The feed reel 70 is likewise attached to a rotatable shaft 120 of the drive device in a detachable fashion, wherein the shaft 120 is freely rotatable in the embodiment in FIG. 1A, i.e. provision is not made for a drive that would make the shaft 120 rotate. Nevertheless, it is self-evident that a drive mechanism can also be provided for the shaft 120 in a more complex embodiment, for example to be able to change the transport direction of the band.

Before the cells 20 are deposited on the band 30, the feed reel 70 with a still unoccupied band 30 is placed onto the shaft 120 and, if need be, fixed in order to prevent it slipping off the shaft. An empty take-up reel 80 is placed on the drive shaft 110 and it is likewise fixed if need be. An initial section of the band 30 of the feed reel 70 is then—manually or else automatically—guided past the outlet opening 60 and attached to the take-up reel 80, for example by clamping or the like. The drive shaft 110 can subsequently be made to rotate, and so the band 30 is transported from the feed reel 70 to the take-up reel 80, while the cell suspension 50 with cells 20 simultaneously flows onto the band 30 from the outlet opening 60.

The rotational directions of the shafts 110, 120 are illustrated by arrows 111, 121.

Ideally, the unwinding and winding occurs continuously and with a constant speed v, i.e. the band runs past the outlet opening 60 at the speed v. To this end, the drive shaft 110, on which the take-up reel 80 has been attached, rotates with a constant angular speed w. The speed v is only limited by the supply of cell suspension 50 through the outlet opening 60. By way of example, the band speed can reach an order of v=10 cm/s. Care has to be taken that the liquid film 90 does not rip during the application of cells 20 onto the band 30. Furthermore, it is advantageous if the aforementioned flow rate dn/dt or dVol/dt through the outlet opening 60 of the vessel 40 should be matched to the band speed v in order to ensure that the band 30 is sufficiently covered by cell suspension such that the liquid film 90 neither rips nor becomes too thick.

The height or thickness h of the liquid film 90, which is of the order of h≈5-50 µm, can also be varied by virtue of the fact that the distance between the vessel 40 or the outlet opening 60 and the band 30 can be set, for example by displacing the vessel 40 and/or the band 30 in the z direction. The thickness h of the liquid film 90 can moreover be set by virtue of providing a stripping object 130, which is likewise displaceable in the z-direction. Ideally, the height h of the liquid film 90 is matched to the size of the cells to be deposited on the band such that the liquid film 90 only has a single cell layer, i.e. that no two cells can lie on top of one another in the z-direction.

Initially, the assumption that radially adjacent winding layers of the band 30 rest against one another in the wound state of the band 30 can be made. Hence, spacers 140 are provided on the upper side 31 of the band 30, on which the cells 20 are applied, and these spacers prevent the winding layers of the band 30 from contacting one another in the wound-up state. This is particularly relevant for the take-up reel 80, since the band 30 here, on the upper side 31 thereof, carries the cell suspension 50 with the cells 20. Without spacers, the cells 20 would be under considerable mechanical loads when the band is wound. Naturally, it is also possible, in principle, to attach corresponding spacers on the lower side 32 of the band 30 as well. By way of example, so-called "microspheres" or "microbeads", for example made of glass or plastic, can be used as spacers 140 and these have at least the dimensions of the cells 20, i.e. at least the radius thereof. Ideally, the adjustable height h of the liquid film 90 and the dimensions of the spacers 140 are matched to one another.

The upper side 31 of the band 30 is covered by an adhesion promoter, e.g. polylysine, fibronectin or collagen, which causes the cells 20 to adhere to the surface 31. However, since the liquid film 90 is automatically pulled along when the cells 20 are deposited on the band 30, the cells 20 can optionally also be held on the band 30 without such chemical fixing. This affords the possibility of continuing to use the cells for e.g. molecular examinations after scanning. The adhesion promoters primarily assist during the application of the cells on the band in order to fix the cells as quickly as possible. The promoters can subsequently be used to suppress a change in the position of the cells on the band, for example if the band is once again pulled through a liquid. Drying can be avoided by storing the take-up reel in moist surroundings.

The lower side 32 of the band 30 has a surface to which the cells 20 do not adhere. The contact angle of water on the lower side 32 can be matched to the liquid film 90 by an appropriate material selection and surface property, for example by hydrophobizing the surface, for example by functionalizing the polymer film surface using silanes.

The surface of the band 30 or of the upper side 31 of the band 30 can be structured as described in "Single stem cell positioning on polylysine and fibronectin microarrays" by Ruiz et al. (in Micro- and Nanosystems, 2009, 1, 50-56) such that the cells 20 can be positioned on the band in a targeted fashion such that the subsequent scanning of the band 30 is made simpler.

US 2007/0259382 A1 describes that specifically sought-after cells can be enriched on the band. The cells are marked and covalently bonded to a correspondingly functionalized surface by the so-called "avidin/biotin" system (cf. FIG. 5). Non-bonded or only weakly bonded cells can be subjected to a washing step after the cells are transferred onto the band, wherein, under controlled stringent conditions, unmarked cells are washed away. This reduces the number of cells that need to be scanned.

Following the above-described winding of the band 30 provided with cells 20 onto the take-up reel 80, the latter is removed from the drive shaft 110 and either stored for later evaluation or analysis or else directly brought to a scanning device. In addition to a scanner 170, which can for example be embodied as a fluorescence microscope, with a scanning region 180, the scanning device, illustrated in FIG. 1B, has an apparatus by which the wound-up band can be unwound again and supplied to the scanner 170 for analyzing the cell sample on the band 30 or scanned by the optical detector of the scanner. By way of example, like the apparatus described in conjunction with FIG. 1A, this one can have a freely rotatable shaft 190 and a drive shaft 200, wherein the take-up reel 80 in this case is attached to the freely rotatable shaft 190. A further take-up reel 210 is attached to the drive shaft 200 and the band 30 provided with the cells 20 should be transported thereon while the scanner 170 analyzes the cells 20 stored on the band 30 as these pass through the scanning region 180. Furthermore, provision is made for a cover slip 220 for microscopy which, in this embodiment, simultaneously assumes the function of the stripping object 130 from FIG. 1A.

The rotational directions of the shafts 190, 200 are illustrated by arrows 191, 201.

As merely indicated by the arrow 230, it is optionally possible to supply additional buffer suspensions and/or reagents, for example in order to subsequently mark cells (so-called "labeling").

When the band 30 or the cells 20 are scanned, the band is ideally also transported continuously and with a constant speed v through the scanning region 180.

Alternatively, and as described in conjunction with FIG. 2, it is naturally also possible to examine or scan the cells 20 directly after depositing the latter on the band 30 by an appropriate scanner 170, e.g. a fluorescence microscope or the like. Accordingly, FIG. 2 shows combined equipment including a device for preparing the band with the cells to be examined, as in FIG. 1A, and a scanning device, as in FIG. 1B.

Furthermore, the embodiment in FIG. 2 differs from those in FIGS. 1A and 1B in that a tensioning device 150 is provided as per FIG. 2; it is embodied in the form of a support 160 for tensing the band 30. As indicated by the arrow 161, the support 160 can be displaced in the z-direction, as a result of which the tension in the band 30 can be set. Alternatively, the tensioning device (150) can also have one or more reels (not illustrated) in place of, or in addition to, the support 160, which one or more reels can likewise be displaced in the direction of the arrow 161 and cause the band 30 to be tensioned. Alternatively, or in addition thereto, the tension in the band 30 can be influenced by virtue of the fact that the feed reel 70 and/or take-up reel 80 can be displaced as indicated by the arrows 71, 81. By way of example, the axes of the shafts 110, 120 can to this end be embodied to be displaceable in the x-direction.

It is self-evident that such a tensioning device can also be provided in the embodiments as per FIGS. 1A and/or 1B.

In this embodiment, the cells 20 brought onto the band 30 are scanned with the aid of the scanner 170 directly after they are deposited on the band 30. The band 30 with the cells 20 is only subsequently wound onto the take-up reel 80. Like in FIG. 1B, the cover slip 220 simultaneously acts as a stripping object, by which the height h of the liquid film 90 is set.

FIG. 3 shows a longitudinal section through a band 30 in the upper part of the illustration. On the upper side 31 of the band 30 there is an adhesive layer 33, which acts as an adhesion promoter and for example has polylysine, fibronectin or collagen such that the cells 20 adhere to the upper side 31. On the lower side 32 of the band 30 there is a layer 34 to which the cells 20 do not adhere. The intermediate region 35 of the band 30 between the layers 33, 34 is e.g. a polymer, which can also have a transparent embodiment, or a metal.

The lower part of FIG. 3 shows an exemplary view of the band 30 provided with cells 20 and spacers 140. The spacers 140 are arranged on the band 30 such that, like for the cells 20, this also results in a stochastic distribution. The focal region 240 of the fluorescence microscope 170 is likewise indicated. As described above, the band 30 is moved in the x-direction with a speed v. The resultant cell density on the band, i.e. the number of cells 20 per unit area, depends on the adherence of the cells 20 on the upper side 31 of the band 30, the speed v and the flow rate dn/dt or dVol/dt.

FIG. 4 shows an alternative embodiment of the band 30, more particularly of the adhesive layer 33. Here, the band 30 is embodied as a functionalized band 30 such that the cells 20 only adhere to the band 30 at defined positions. This is achieved by virtue of the fact that the adhesive layer 33 is structured. While the adhesive layer 33 in FIG. 3 covers the intermediate region 35 of the band 30 completely and without gaps, the intermediate region 35 in the embodiment of FIG. 4 is only covered with an adhesive layer 33 at those defined positions 36 at which cells 20 should be bonded. For reasons of clarity, only some of these positions 36 are indicated in FIG. 4.

The lower part of the illustration in FIG. 4 shows a plan view of the band 30. The cells 20 are arranged at defined positions in the x-direction, i.e. in the transport direction of the band 30. Naturally, it is also possible to set defined positions in the y-direction by applying the adhesive layer 33 onto the intermediate layer 35 not only in strips, but for example in a crossed arrangement (not illustrated).

The aforementioned "labeling" or marking works as a result of using e.g. avidin as structured adhesive layer 33, as indicated in FIG. 5. Biotin 37 is used to characterize cells 20. Since it is well known that avidin 33 is suitable for bonding biotin 37, marked or labeled cells 20 can be fixed at defined positions on the band 30.

Since avidin only binds cells marked with biotin, the avidin-biotin system is very specific. That is to say this system could be used to bond specific cells only, which cells are e.g. moreover marked by antibodies, the antibodies additionally carrying biotin.

The dimensions l=100 m, b=10-50 mm, d=10-500 μm of the band specified above should naturally only be understood as an example. It is self-evident that other values are feasible, particularly in respect of the length l and the width b. Here, the width b of the band can for example be matched to the dimensions of the scanning region of the optics. A typical fluorescence microscope can, in a direction perpendicular to the running direction of the band, i.e. in the x-direction as per FIG. 1, scan a region of the order of ~1 cm. A width b of the band of b≈1 cm could accordingly be selected. The length l of the band can likewise be directed at the technical conditions. By way of example, it is simple to calculate a required band length l from the amount of cell suspension to be applied onto the band in combination with the available width b of the band. A sample volume of 1 ml whole blood covers an area of 100 000 mm$^2$ if the liquid film 90 has a height h of 10 μm. Accordingly, a band length of l=10 m is required if the band has a width of b=10 mm.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in *Superguide* v. *DIRECTV,* 69 USPQ2d 1865 (Fed. Cir. 2004).

The invention claimed is:

1. A system for depositing cells, comprising:
   a rotatable drive shaft;
   a take-up reel attached to the rotatable drive shaft, the take up reel receiving a flexible band wound thereon upon movement of the flexible band along a movement direction;
   a vessel to store configured to store the cells in a cell suspension to be deposited on a surface of the flexible band to form a liquid film including the cells, the vessel having an outlet opening for removing cells;
   a liquid film, including the cells, formed on the flexible band by deposition of the cell suspension through the outlet opening of the vessel and onto the flexible band;
   the flexible band including:
   a contiguous flexible band layer having a length along the movement direction and having a first thickness between an upper surface and a lower surface of the contiguous flexible band layer, the contiguous flexible band layer extending contiguously in the movement direction, the upper surface of the contiguous flexible band layer being continuous along the length of the band layer:
   a non-adhesive layer to which the cells do not adhere provided on the lower surface of the contiguous flexible band layer, the non-adhesive layer having a second thickness and extending contiguously along the flexible band in the movement direction;
   a plurality of spaced-apart adhesive bands provided on and covering first areas of the upper surface of the contiguous flexible band layer to define a non-contiguous array of adhesive bands extending along the length of the contiguous flexible band layer in the movement direction;
   wherein each adjacent pair of the plurality of spaced-apart adhesive bands are separated from each other by an exposed area of the upper surface of the contiguous flexible band layer to thereby define a plurality of exposed areas arranged in an alternating manner with the plurality of adhesive bands, the plurality of exposed areas of the upper surface being directly exposed to the liquid film; and
   wherein the plurality of adhesive bands project above the plurality of exposed areas of the upper surface of the contiguous flexible band layer, to thereby define a recessed void between each adjacent pair of the plurality of adhesive bands, each respective adhesive band of the plurality of adhesive bands having (a) a pair of sidewalls on opposite sides of the respective adhesive band, each sidewall facing a respective adjacent adhesive band in the movement direction, and (b) an upper adhesive surface extending in the movement direction fully between the pair of sidewalls and facing away from the contiguous flexible band layer, the upper adhesive surfaces of the plurality of adhesive bands configured to promote adhesion of the cells to the flexible band; and wherein the outlet opening of the vessel is located above the adhesive bands by a distance corresponding to the size of the cells to define a thickness of the liquid film on the flexible band that is configured to prevent individual cells from lying on top of one another on the adhesive bands, thereby defining a single cell layer in the liquid film in a direction perpendicular to the movement direction;

wherein the take-up reel is rotatable to move the flexible band past the outlet opening and wind the flexible band provided with the liquid film including the cells adhered to the plurality of spaced-apart adhesive bands provided on the flexible band, onto the take-up reel.

2. The system as claimed in claim 1, wherein the contiguous flexible band layer substrate is a polymer band or a metal band.

3. The system as claimed in claim 1, wherein spacers are provided on the upper surface and/or the lower surface of the contiguous flexible band substrate layer.

4. The system as claimed in claim 1, wherein a tensioning device is provided for tensing the flexible band, the tensioning device comprising a moveable platform underlying the flexible band or a moveable reel, movable in a direction perpendicular to the movement direction of the flexible band.

5. The system as claimed in claim 4, wherein the tensioning device is provided opposite the outlet opening such that the flexible band runs between the tensioning device and the outlet opening.

6. The system as claimed in claim 3, wherein the spacers are spherical and are stochastically distributed across the upper surface and/or lower surface of the flexible band.

7. The system as claimed in claim 1, wherein each adjacent pair of adhesive bands are spaced apart from each other by a defined distance such that cells adhered to each adhesive band are held spaced apart from cells adhered to adjacent adhesive bands.

8. The system as claimed in claim 1, wherein the thickness of the liquid film on the flexible band defined by the distance between the outlet opening of the vessel and the underlying adhesive bands is in the range of 5-50 µm.

9. The system as claimed in claim 1, wherein the thickness of the liquid film on the flexible band is 10 µm.

* * * * *